(12) United States Patent
Lv et al.

(10) Patent No.: US 9,638,393 B2
(45) Date of Patent: May 2, 2017

(54) LIGHT DISTRIBUTION METHOD FOR COB MODULE LED STREET LAMP LENS CAPABLE OF ILLUMINATING 3-5 LANES

(71) Applicant: HONGLI LIGHTING GROUP CO., LTD., Yixing (CN)

(72) Inventors: Guofeng Lv, Yixing (CN); Wenqing Lv, Yixing (CN)

(73) Assignee: HONGLI LIGHTING GROUP CO., LTD., Yixing (CN)

( * ) Notice: Subject to any disclaimer, the term of this patent is extended or adjusted under 35 U.S.C. 154(b) by 0 days.

(21) Appl. No.: 14/913,422

(22) PCT Filed: Nov. 27, 2014

(86) PCT No.: PCT/CN2014/092329
§ 371 (c)(1),
(2) Date: Feb. 22, 2016

(87) PCT Pub. No.: WO2015/109891
PCT Pub. Date: Jul. 30, 2015

(65) Prior Publication Data
US 2016/0201876 A1 Jul. 14, 2016

(30) Foreign Application Priority Data
Jan. 22, 2014 (CN) .......................... 2014 1 0028523

(51) Int. Cl.
*F21V 5/04* (2006.01)
*F21V 5/08* (2006.01)
(Continued)

(52) U.S. Cl.
CPC ................ *F21V 5/08* (2013.01); *F21V 5/008* (2013.01); *F21V 5/04* (2013.01); *F21S 8/086* (2013.01);
(Continued)

(58) Field of Classification Search
CPC .... F21S 8/086; F21V 5/04; F21V 5/08; F21V 5/008; F21W 2131/103; F21Y 2101/00; F21Y 2115/10; Y02B 20/72
See application file for complete search history.

(56) References Cited

U.S. PATENT DOCUMENTS 8,348,475 B2 * 1/2013 Wilcox .................. F21V 5/008
362/311.02
9,080,739 B1 * 7/2015 Sayers ...................... F21V 5/00
(Continued)

FOREIGN PATENT DOCUMENTS

CN 102818218 A 12/2012
CN 103375769 A 10/2013
(Continued)

OTHER PUBLICATIONS

The World Intellectual Property Organization (WIPO) International Search Report for PCT/CN2014/092329 Mar. 2, 2015.

*Primary Examiner* — Peggy Neils
(74) *Attorney, Agent, or Firm* — Anova Law Group, PLLC

(57) ABSTRACT

The invention relates to a light distribution method for a COB module LED street lamp lens capable of illuminating 3 or 5 lanes. The light distribution method is characterized in that the light emitted by a COB module LED light source is firstly refracted by a drop-shaped refraction lens and then refracted secondarily by a light distribution curved surface lens to achieve an optimal irradiation effect. The light distribution method provides a foundation for the use of a single COB module LED light source in an urban road, and has the advantages of low cost and high efficiency.

7 Claims, 14 Drawing Sheets

(51) Int. Cl.
*F21V 5/00* (2015.01)
*F21S 8/08* (2006.01)
*F21W 131/103* (2006.01)
*F21Y 101/02* (2006.01)

(52) U.S. Cl.
CPC .... *F21W 2131/103* (2013.01); *F21Y 2101/02* (2013.01); *Y02B 20/72* (2013.01)

(56) References Cited

U.S. PATENT DOCUMENTS

| | | | | |
|---|---|---|---|---|
| 2012/0039077 | A1* | 2/2012 | Householder | G02B 17/086 |
| | | | | 362/308 |
| 2015/0204512 | A1* | 7/2015 | Chen | F21V 7/0091 |
| | | | | 362/296.05 |
| 2016/0201876 | A1* | 7/2016 | Lv | F21V 5/008 |
| | | | | 362/268 |

FOREIGN PATENT DOCUMENTS

| | | |
|---|---|---|
| CN | 103807806 A | 5/2014 |
| JP | 2011040315 A | 2/2011 |

\* cited by examiner

LIGHT DISTRIBUTION METHOD FOR COB MODULE LED STREET LAMP LENS CAPABLE OF ILLUMINATING 3-5 LANES

CROSS-REFERENCES TO RELATED APPLICATIONS

This application is a national stage patent application of PCT application No. PCT/CN2014/092329, filed on Nov. 27, 2014. This application claims priority to Chinese Patent Application No. 201410028523.7, filed on Jan. 22, 2014, the entire content of which is incorporated herein by reference.

FIELD OF THE INVENTION

The present invention relates to a lighting technology, particularly to a road lighting technology, and specifically to a light distribution method for a COB module LED street lamp lens capable of illuminating 3 or 5 lanes.

BACKGROUND

The existing LED (Light Emitting Diode) street lamps are roughly divided into two kinds according to different light sources: one kind of street lamp adopts a single-chip small LED light source, namely, a street lamp which is composed of dozens of to hundreds of 1-3 W single-chip small LEDs and a light distribution lens array thereof; and the other kind of street lamp is composed of a chip on board (COB) module LED light source and a light distribution lens. The street lamp composed of a plurality of 1-3 W single-chip small LEDs and a light distribution lens array needs to have the power of 240 W and even higher under the requirement of large lighting range and high uniformity, e.g., when 5 lanes on a single side needs to be lighted, and then the street lamp needs to be composed of hundreds of LEDs and light distribution lenses thereof, so that the PCB (Printed Circuit Board) and the radiator are large and the lamp cap is also extremely huge. In addition, the combination of so many small LED light sources and the lenses thereof is generally high in manufacturing cost.

Moreover, the following external environmental factor should be considered: because the light distribution lens of the single 1-3 W single-chip small LED is substantially a plastic lens formed by injection molding and is generally made of PMMA (polymethyl methacrylate) or PC (polycarbonate), the lens may yellow and crack and the transparency declines sharply after 3-5 years of blowing, rain flushing, solarization, ultraviolet irradiation, heat expansion and cold contraction and dust adhesion. Electrostatic adsorption is the greatest threat to the plastic lens, and much dust may be adsorbed onto the surface of the lens after the lens is used for a period of time, the dust is solidified with water on the surface of the lens as lime and is difficult to clean, so that the optical efficiency of the lens is greatly influenced.

As to the so-called COB module LED light source, namely, chip On board module LED light source, a bare wafer is adhered to an interconnected substrate with conductive or non-conductive adhesive and then electrically connected with the substrate by lead bonding (the flip chip mode does not need lead bonding), thus realizing an LED wafer and substrate integrating technology.

FIG. 1 is a structural schematic diagram of the so-called COB module LED light source. The COB module LED light source is cheap, and one light source can generally integrate dozens of to hundreds of watts of chips. The single light source is much cheaper than dozens of to hundreds of 1-3 W single-chip small LEDs. In addition, a light source module only needs a glass light distribution lens and can meet the light distribution requirement of the street lamp, so the cost of the lens is reduced much. Generally, a several-hundred-watt street lamp can meet the road lighting requirement by adopting several COB module LED light sources.

The glass lens has other advantages: the transparency of the glass lens is relatively high, and the optical efficiency of the glass lens generally can reach over 95%; in addition, the glass lens is relatively good in corrosion and heat resistance, and will not be yellowed, scratched or influenced by static electricity after many years; and dust on the surface of the lens can be automatically flushed by rainwater.

Therefore, how to utilize the COB module LED light source to realize multi-lane lighting is the key of improving the lighting efficiency and reducing the production and use costs, and light distribution to the lighting lamp is the key of realizing multi-lane lighting with a single light source.

The disclosed methods and devices are directed to solve one or more problems set forth above and other problems.

BRIEF SUMMARY OF THE DISCLOSURE

One aspect of the present disclosure includes a light distribution method for a COB module LED street lamp lens capable of illuminating 3 or 5 lanes. The light emitted by a COB module LED light source is firstly refracted by a drop-shaped refraction lens and then refracted secondarily by a light distribution curved surface lens to achieve an optimal irradiation effect. The section profile line of the drop-shaped refraction lens in the direction perpendicular to the road, namely, the Y-Y direction, is composed of an inclined long elliptic arc and a short arc. The section profile line of the drop-shaped refraction lens in the road extending direction, namely, the X-X direction, is semicircular, and the curved surface of the drop-shaped refraction lens 11 is formed by sweeping the section profile line in the Y-Y direction along the section profile line in the X-X direction.

The light distribution curved surface lens has different angles of asymmetrical light distribution in the Y-Y direction and the X-X direction, the section profile line of the light distribution curved surface lens in the Y-Y direction and an optical axis OZ form a polarization angle, and light distribution to single light satisfies the following condition:

$$\theta 2 = \tan^{-2}\left[\frac{(\theta 1 - \Psi t)\tan\Phi r + (90° - \theta 1)\tan\Phi l}{90° - \Psi t}\right]$$

where θ2 is an included angle between emergent light and the optical axis, and the optical axis is a straight line which passes through the center point O of the COB module LED light source and is perpendicular to a bottom surface. θ1 is an included angle between incident light and the optical axis, Ψt is an included angle between an axis OT connecting a point farthest from a point O on the Y-Y section profile line of the light distribution curved surface lens with the point O and the optical axis OZ, Φl and Φr are respectively included angles between marginal emergent light on the left and the right of the light distribution curved surface lens and the optical axis OZ.

The section profile line in the X-X direction is a symmetrical curve of which the middle is slightly sunken and the shape is similar to a saddle, the middle position is sunken for 0.30-0.36 mm relative to the highest positions of two shoulders, and the light distribution of the light distribution curved surface to the single light satisfies the following condition:

$$\delta 2 = \tan^{-1}\left[\frac{\delta 1}{90°} \cdot \tan 74°\right]$$

where δ1 is an included angle between the incident light OU and the optical axis OZ, and δ2 is an included angle between the emergent light VW and the optical axis; the light distribution curved surface lens is formed by sweeping the section profile line in the Y-Y direction along the section profile line in the X-X direction. The polarization angle Ψt is ranged from −30° to −60°.

The section profile line of the drop-shaped refraction lens in the Y-Y direction is composed of an inclined long elliptic arc ABC and a short arc CD; the short axis of the ellipse is OB, the long axis is OC, the ratio of the long axis to the short axis is 1.6, the inclination angle τ between the short axis OB and the optical axis OZ is −19.3°, the short axis is 10-20 mm and preferably 15 mm so as to just cover a light source surface, and the arc CD and the elliptic arc ABC share a circle center.

All the light emitted from the center point O of the light emitting surface of the COB module LED light source is refracted by the concave surface of the drop-shaped refraction lens and then distributed by the light distribution curved surface lens arranged above, and the highest light intensity direction of the emergent beams after the light distribution is shot out in the polarization axis OT direction of the lens.

All the light emitted from the center point O of the light emitting surface of the COB module LED light source is refracted by the concave surface of the drop-shaped refraction lens, the direction of the refracted light is kept unchanged, the light is not polarized and is directly distributed by the light distribution curved surface lens arranged above, and the emergent light after the light distribution is uniformly distributed within a range of ±74° with the optical axis OZ.

Other aspects of the present disclosure can be understood by those skilled in the art in light of the description, the claims, and the drawings of the present disclosure.

BRIEF DESCRIPTION OF THE DRAWINGS

The following drawings are merely examples for illustrative purposes according to various disclosed embodiments and are not intended to limit the scope of the present disclosure.

DETAILED DESCRIPTION

Reference will now be made in detail to exemplary embodiments of the invention, which are illustrated in the accompanying drawings. Hereinafter, embodiments consistent with the disclosure will be described with reference to drawings. It is apparent that the described embodiments are some but not all of the embodiments of the present invention. Based on the disclosed embodiments, persons of ordinary skill in the art may derive other embodiments consistent with the present disclosure, all of which are within the scope of the present invention.

The aim of the present invention is to provide a light distribution method for a COB module LED street lamp lens capable of illuminating 3 or 5 lanes based on a COB module LED light source. The present invention will be further described below in combination with the accompanying drawings and the embodiments.

Embodiment 1 may be referred to FIGS. 1-14.

A light distribution method for a COB module LED street lamp lens capable of illuminating 3 or 5 lanes is substantially characterized in that the light emitted by a COB module LED light source is firstly refracted by a drop-shaped refraction lens 11 and then refracted secondarily by a light distribution curved surface lens 12 to achieve an optimal irradiation effect. Both the drop-shaped refraction lens 11 and the light distribution curved surface lens 12 are manufactured by adopting high borosilicate glass. The details may be explained as follows.

Figure 1:
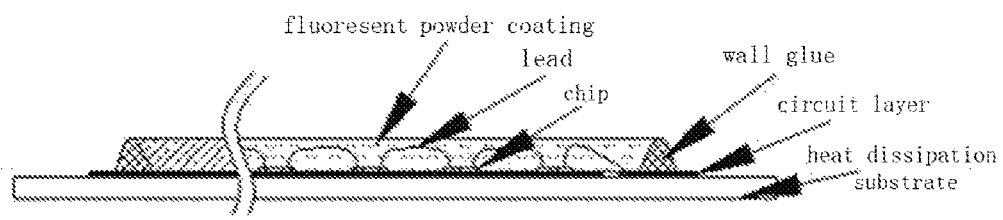
FIG. 1 is a structural schematic diagram of a COB module LED light source in the present invention.
Figure 2:
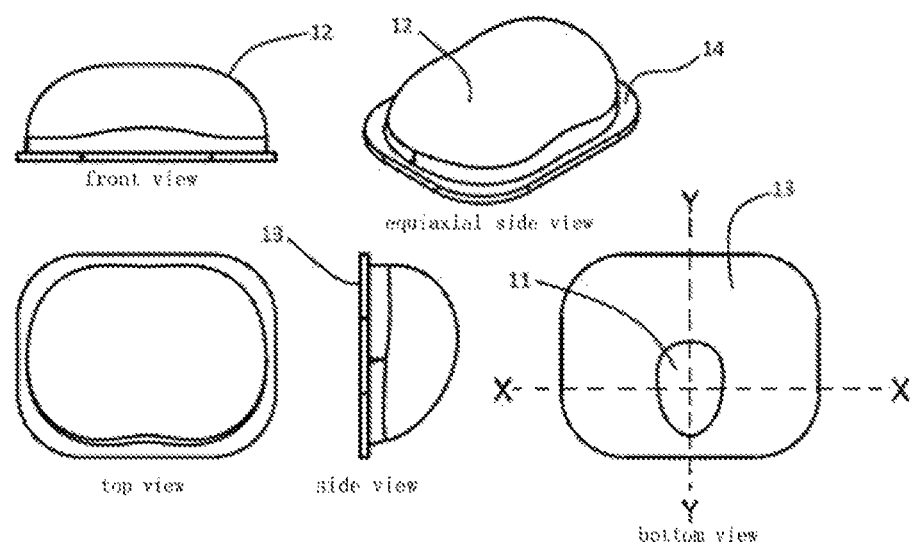
FIG. 2 shows three views of a specific embodiment 1 of a secondary optical lens involved in the present invention.

As to a light distribution method for a COB module LED street lamp lens for 5 lanes, the three-dimensional views of the whole street lamp adopting a COB module LED light source shown in FIG. 1 as a lighting point are shown in FIG.

Figure 3:
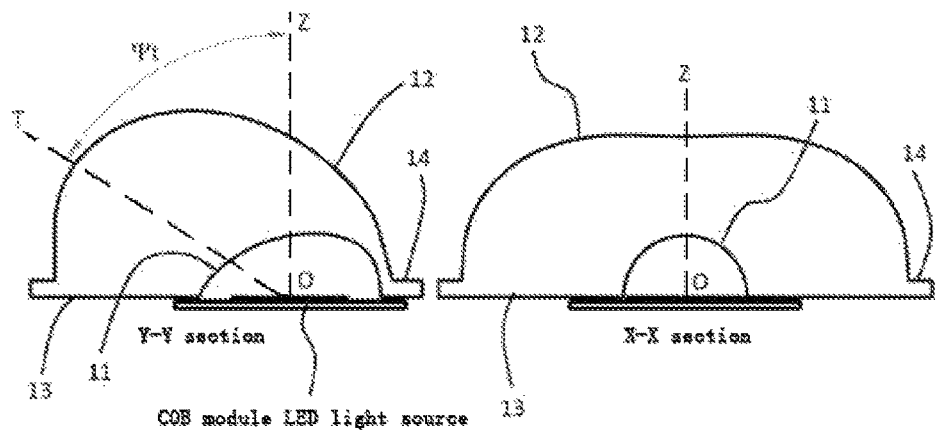
FIG. 3 shows sectional views of the specific embodiment 1 of a secondary optical lens involved in the present invention in the Y-Y direction and the X-X direction.

2, and the sectional views of the lens in the X-X direction (the road extending direction) and the Y-Y direction (the direction perpendicular to the road) are shown in FIG. 3.

According to the structure characteristic, the lens is composed of a drop-shaped incident concave surface 11 close to the light source below, a light distribution curved surface 12 arranged above, a bottom plane 13 and a mounting platform 14. The section profile line of the drop-shaped incident concave surface 11 of the secondary optical lens in the Y-Y direction is composed of an inclined long elliptic arc and a short arc, as shown by the left view in FIG. 3; and the section profile line of the drop-shaped incident concave surface 11 of the secondary optical lens in the X-X direction is semicircular, as shown by the right view in FIG. 3.

The section profile line of the light distribution curved surface 12 of the secondary optical lens in the Y-Y direction and an optical axis OZ form a polarization angle Ψt, the polarization angle is ranged from −30° to −60°, the polarization angle Ψt is preferably −58° in the specific embodiment, and the polarization angle is determined according to the road width of 5 lanes and the height of a lamp post, as shown by the left view in FIG. 3.

The polarization angle Ψt is an included angle between an axis OT connecting a point farthest from a point O on the Y-Y section profile line of the light distribution curved surface 12 with the point O and the optical axis OZ. The axis OT represents the highest light intensity direction of emergent beams of the light distribution curved surface 12 in the Y-Y section, namely, the polarization direction, and the axis is also called as a polarization axis of the lens. The section profile line of the light distribution curved surface 12 of the secondary optical lens in the X-X direction is a symmetrical saddle-shaped curve of which the middle is slightly sunken, and the middle position of the curve is sunken for 0.30-0.36 mm relative to the highest positions of two shoulders, as shown by the right view in FIG. 3.

Positive and Negative are defined herein as that the light departing from the optical axis OZ and shot out towards the left is negative, while the light departing from the optical axis OZ and shot out towards the right is positive. OZ is an optical axis which passes through the center point O of the light emitting surface of the COB module LED light source and is perpendicular to the light emitting surface.

Figure 4:
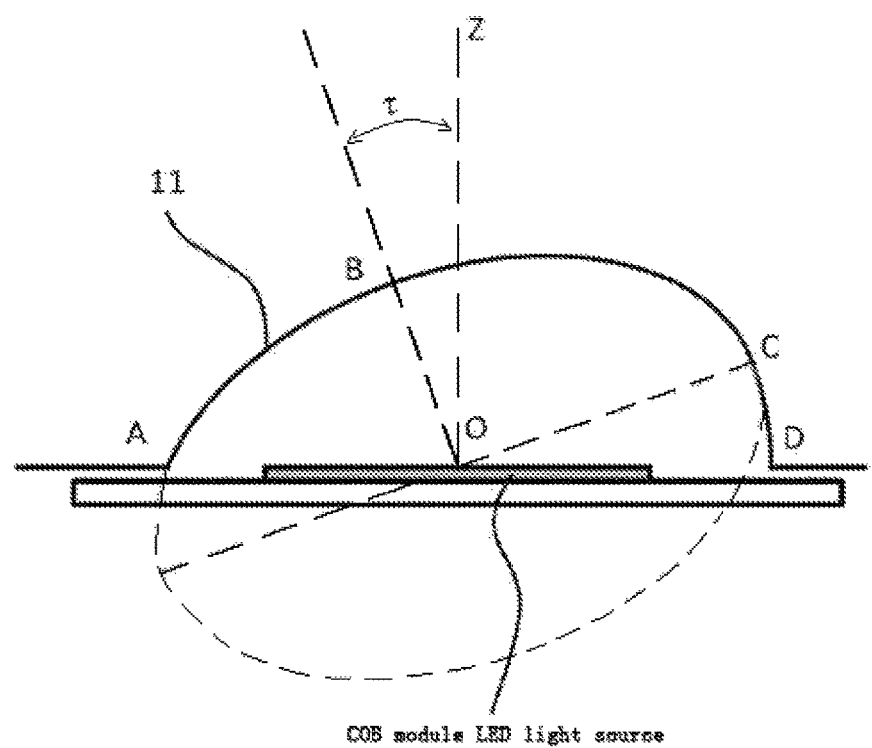
FIG. 4 is a sectional profile of an incident surface in embodiment 1 of the present invention in the Y-Y direction.

The section profile line of the drop-shaped incident concave surface 11 of the secondary optical lens involved in the present invention in the Y-Y direction (the direction perpendicular to the road) is composed of an inclined long elliptic arc ABC and a short arc CD, as shown in FIG. 4. The short axis of the ellipse is OB, the long axis is OC, the ratio of the long axis to the short axis is 1.6, the short axis is 10-20 mm and preferably 15 mm so as to just cover a light source surface, the short axis OB and the optical axis OZ form an inclination angle τ, and τ in the specific embodiment is preferably −19.3°.

The arc CD and the elliptic arc ABC share a circle center. The drop-shaped incident surface in the Y-Y direction has the effect of firstly refracting the light emitted by the COB module LED light source in the direction of the short axis OB of the ellipse, and then the light is refracted secondarily by the free curved surface 12 on the upper surface to realize off-axis light distribution.

Figure 5:
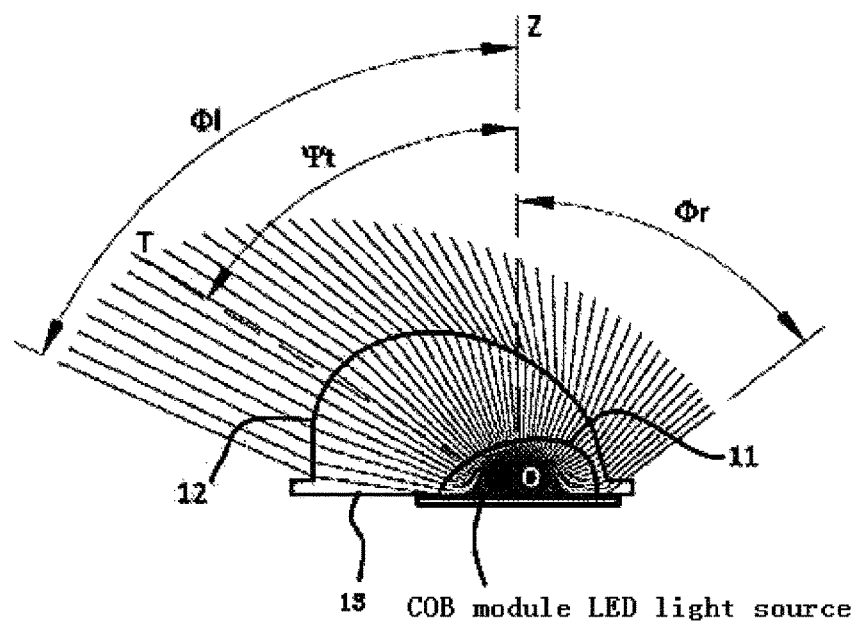
FIG. 5 is a schematic diagram of the light distribution principle of a curved surface 12 in embodiment 1 of the present invention in the Y-Y direction.

FIG. 5 shows the light distribution principle of the light distribution curved surface 12 of the specific embodiment 1 of the secondary optical lens in the present invention in the Y-Y direction. All the light emitted from the center point O of the light emitting surface of the COB module LED light source is refracted by the drop-shaped incident concave surface 11 and then distributed by the light distribution curved surface 12 arranged above, and the highest light intensity of emergent beams after the light distribution is shot out in the direction of the polarization axis OT of the lens.

The polarization angle Ψt is an included angle between an axis OT connecting a point farthest from a point O on the Y-Y section profile line of the light distribution curved surface 12 with the point O and the optical axis OZ. Φl and Φr are respectively included angles between marginal emergent light on the left and the right of the light distribution curved surface 12 and the optical axis OZ, preferably, Φl is −65.8°, and Φr is 52.5°.

Figure 6:
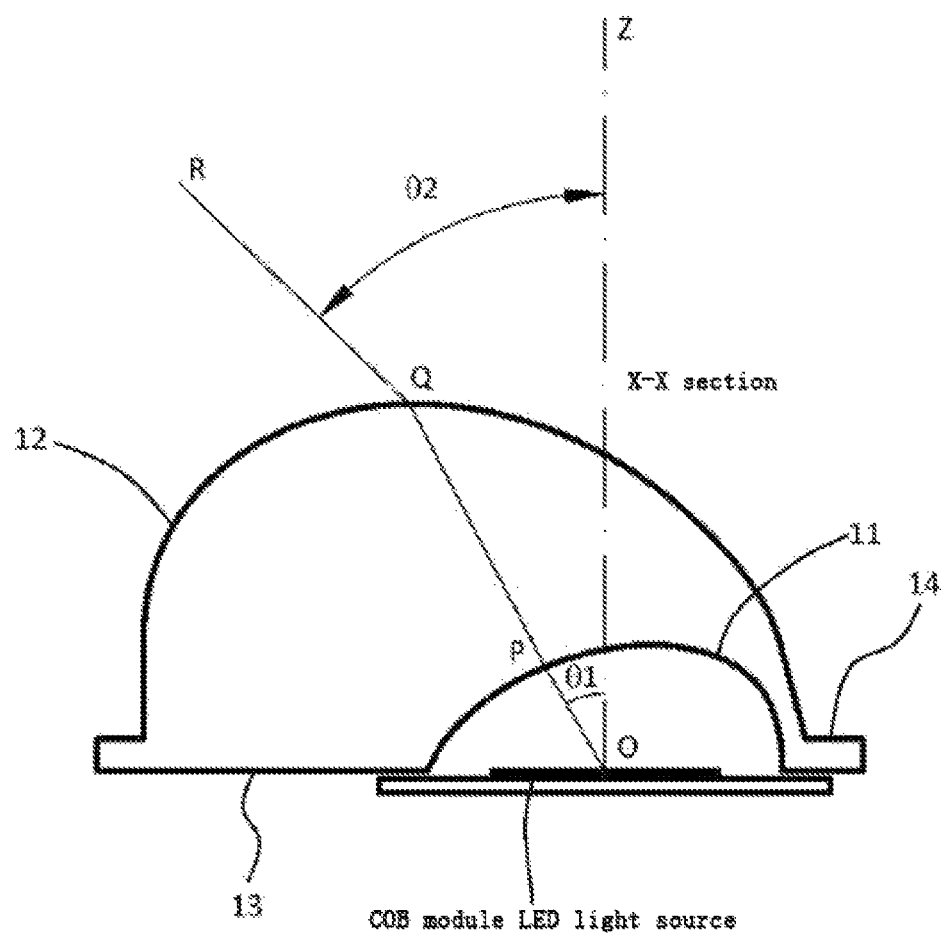
FIG. 6 is a diagram of light distribution of the curved surface to single light in embodiment 1 of the present invention in the Y-Y direction.

FIG. 6 shows light distribution of the curved surface 12 of the specific embodiment 1 of the secondary optical lens in the present invention in the Y-Y direction to single light. The light OP emitted from the center point O of the light emitting surface of the COB module LED light source is refracted by the drop-shaped incident surface 11, the refracted light PQ is shot to the light distribution curved surface 12 arranged above and distributed, and the emergent light after the light distribution is shot out in the direction QR.

It is supposed that the included angle between the incident light OP and the optical axis OZ is θ1 and the included angle between the emergent light QR and the optical axis is θ2, the emergent angle θ2 and the incident angle θ1 satisfy the following light distribution condition:

$$\theta 2 = \tan^{-2}\left[\frac{(\theta 1 - \Psi t)\tan\Phi r + (90° - \theta 1)\tan\Phi l}{90° - \Psi t}\right] \quad \text{Formula (I)}$$

According to Formula (1), when the included angle θ1 between the incident light and the optical axis OZ is 90°, it can be concluded that the emergent angle θ2 is Φr; when the included angle θ1 between the incident light and the optical axis OZ is Ψt, it can be concluded that the emergent angle θ2 is Ψt, so are the emergent angles at other positions.

Table 1 shows a corresponding relationship between the emergent angle θ2 and the incident angle θ1 when single light is distributed by the curved surface 12 in the Y-Y direction in the specific embodiment 1 corresponding to Formula (1).

The coordinate value of each point (X, Y) on the section profile line of the curved surface 12 of the secondary optical lens of the present invention in the Y-Y direction in the specific embodiment 1 is calculated by computer programming through a point-by-point integrating mathematical iterative method according to the light distribution relationship of formula (1).

Figure 7:
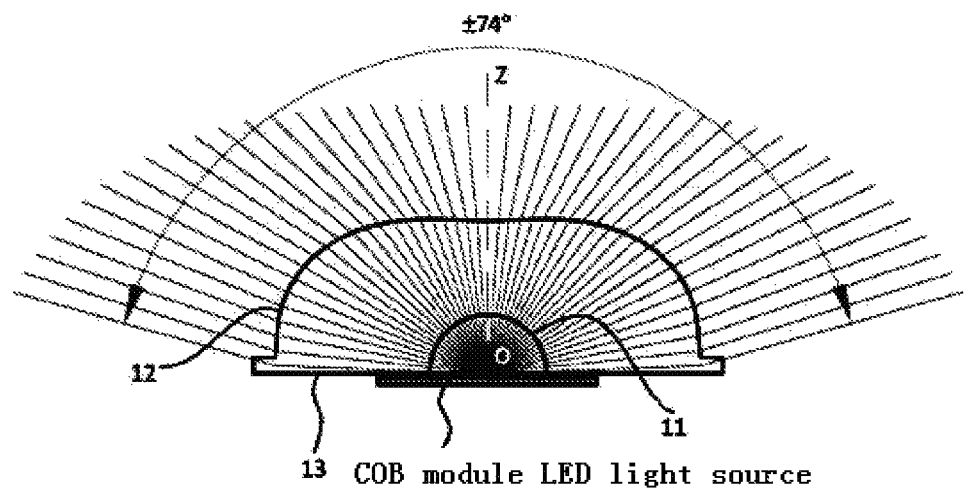
FIG. 7 is a schematic diagram of the light distribution principle of the curved surface in embodiment 1 of the present invention in the X-X direction.

FIG. 7 shows the light distribution principle of the light distribution curved surface 12 of the secondary optical lens of the present invention in the X-X direction. All the light emitted from the center point O of the light emitting surface of the COB module LED light source is refracted by the drop-shaped incident concave surface 11. The section profile line of the drop-shaped incident concave surface 11 in the X-X direction is semicircular, and the circle center thereof is positioned at the center point O of the light emitting surface of the COB module LED light source, so in this direction, the direction of all the light emitted from the center point O of the light emitting surface of the COB module LED light source and refracted by the concave surface of the drop-shaped refraction lens 11 is kept unchanged, the light is not polarized and is directly distributed by the light distribution curved surface lens 12 arranged above, and the emergent light after the light distribution is uniformly distributed within a range of ±74° with the optical axis OZ.

Figure 8:
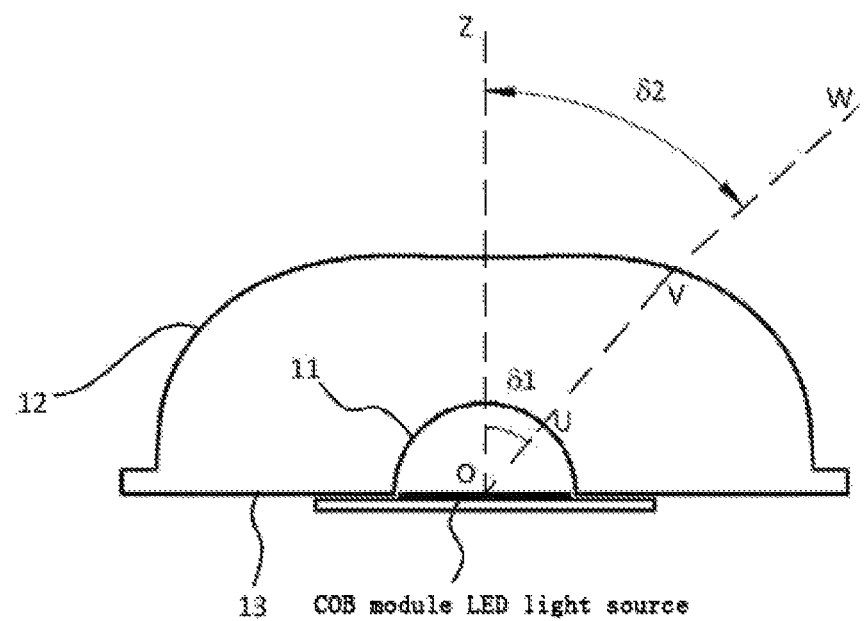
FIG. 8 is a schematic diagram of light distribution of the curved surface in embodiment 1 of the present invention in the X-X direction to single light according to the light distribution principle.

FIG. 8 shows light distribution of the curved surface 12 of the secondary optical lens of the present invention in the X-X direction in the specific embodiment 1 to single light. The light OU emitted from the center point O of the light emitting surface of the COB module LED light source is refracted by the drop-shaped incident surface 11, the refracted light UV is shot to the light distribution curved surface 12 arranged above and distributed, and the emergent light after the light distribution is shot out in the direction VW. It is supposed that the included angle between the incident light OU and the optical axis OZ is δ1 and the included angle between the emergent light VW and the optical axis is δ2, the emergent angle δ2 and the incident angle δ1 satisfy the following light distribution condition:

$$\delta 2 = \tan^{-1}\left[\frac{\delta 1}{90°} \cdot \tan 74°\right] \quad (2)$$

Table 2 shows a corresponding relationship between the emergent angle δ2 and the incident angle δ1 when single light is distributed by the curved surface 12 in the X-X direction in the specific embodiment 1 corresponding to formula (2).

TABLE 1

| Incident Angle θ1 (°) | Emergent Angle θ2 (°) |
|---|---|
| −90 | −65.829143 |
| −86 | −65.052596 |
| −82 | −64.228003 |
| −78 | −63.351138 |
| −74 | −62.417322 |
| −70 | −61.421367 |
| −66 | −60.357524 |
| −62 | −59.21942 |
| −58 | −58 (direction of the polarization axis OT of the lens) |
| −54 | −56.691457 |
| −50 | −55.285176 |
| −46 | −53.771682 |
| −42 | −52.140601 |
| −38 | −50.380652 |
| −34 | −48.47968 |
| −30 | −46.424756 |
| −26 | −44.202364 |
| −22 | −41.798727 |
| −18 | −39.200293 |
| −14 | −36.394448 |
| −10 | −33.370476 |
| −6 | −30.1208 |
| −2 | −26.642474 |
| 2 | −22.938842 |
| 6 | −19.021175 |
| 10 | −14.910008 |
| 14 | −10.63581 |
| 18 | −6.238646 |
| 22 | −1.766596 |
| 26 | 2.727046 |
| 30 | 7.18743 |
| 34 | 11.56209 |
| 38 | 15.804467 |
| 42 | 19.876457 |
| 46 | 23.749728 |
| 50 | 27.405811 |
| 54 | 30.83526 |
| 58 | 34.036219 |
| 62 | 37.012758 |
| 66 | 39.773246 |
| 70 | 42.328899 |
| 74 | 44.692604 |

TABLE 1-continued

| Incident Angle θ1 (°) | Emergent Angle θ2 (°) |
|---|---|
| 78 | 46.878011 |
| 82 | 48.898878 |
| 86 | 50.768615 |
| 90 | 52.5 |

TABLE 2

| Incident Angle δ1 (°) | Emergent Angle δ2 (°) |
|---|---|
| 0 | 0 |
| 3.6 | 7.941319 |
| 7.2 | 15.58874 |
| 10.8 | 22.70881 |
| 14.4 | 29.16092 |
| 18 | 34.89511 |
| 21.6 | 39.92864 |
| 25.2 | 44.3181 |
| 28.8 | 48.13714 |
| 32.4 | 51.46215 |
| 36 | 54.36464 |
| 39.6 | 56.90795 |
| 43.2 | 59.14649 |
| 46.8 | 61.12619 |
| 50.4 | 62.8855 |
| 54 | 64.45645 |
| 57.6 | 65.86573 |
| 61.2 | 67.13561 |
| 64.8 | 68.28471 |
| 68.4 | 69.32868 |
| 72 | 70.28071 |
| 75.6 | 71.15197 |
| 79.2 | 71.95196 |
| 82.8 | 72.6888 |
| 86.4 | 73.36948 |
| 90 | 74 |

The coordinate value of each point (X, Y) on the section profile line of the curved surface 12 of the secondary optical lens of the present invention in the X-X direction in the specific embodiment 1 is calculated by computer programming through a point-by-point integrating mathematical iterative method according to the light distribution relationship of formula (2).

The points on the section profile line of the curved surface 12 in the Y-Y direction and the X-X direction in the specific embodiment 1, which are calculated according to the light distribution methods of Formula (1) and Formula (2) above, are respectively connected by B-sample curves in three-dimensional modeling software to form two section profile lines in the Y-Y direction and the X-X direction. The Y-Y section profile line is swept along the X-X section profile line to form a free curved surface, the free curved surface is enveloped into an entity, and then a three-dimensional entity model of the lens can be obtained.

The following is computer simulation and luminosity analysis of the secondary optical lens in the specific embodiment 1 of the present invention. It is supposed that the diameter of the COB module LED light source surface is 28 mm, the light flux is 25000 lumens (250 watts), and the screen is 12 meters away.

Figure 9:
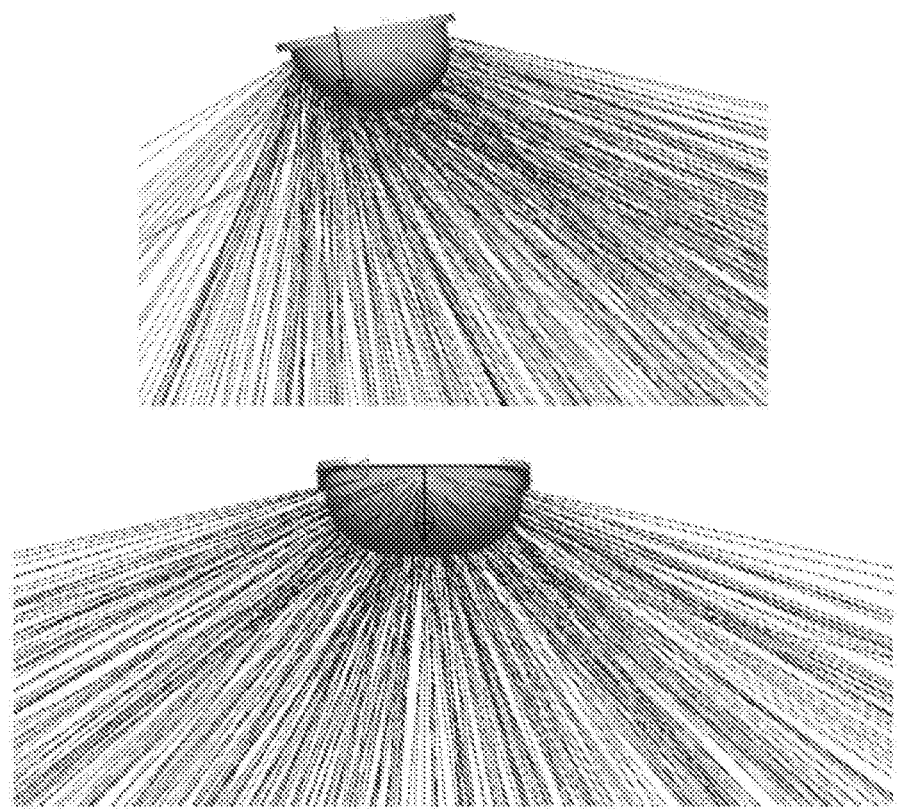
FIG. 9 is a schematic diagram of light loci in embodiment 1 of the present invention.

FIG. 9 shows light loci of the secondary optical lens of the present invention in the specific embodiment 1. It can be roughly seen that in the Y-Y direction (left view), the light is distributed off the axis, and the emergent light is inclined; while in the X-X direction (right view), the emergent light is distributed in a large-angle symmetrical mode.

Figure 10:
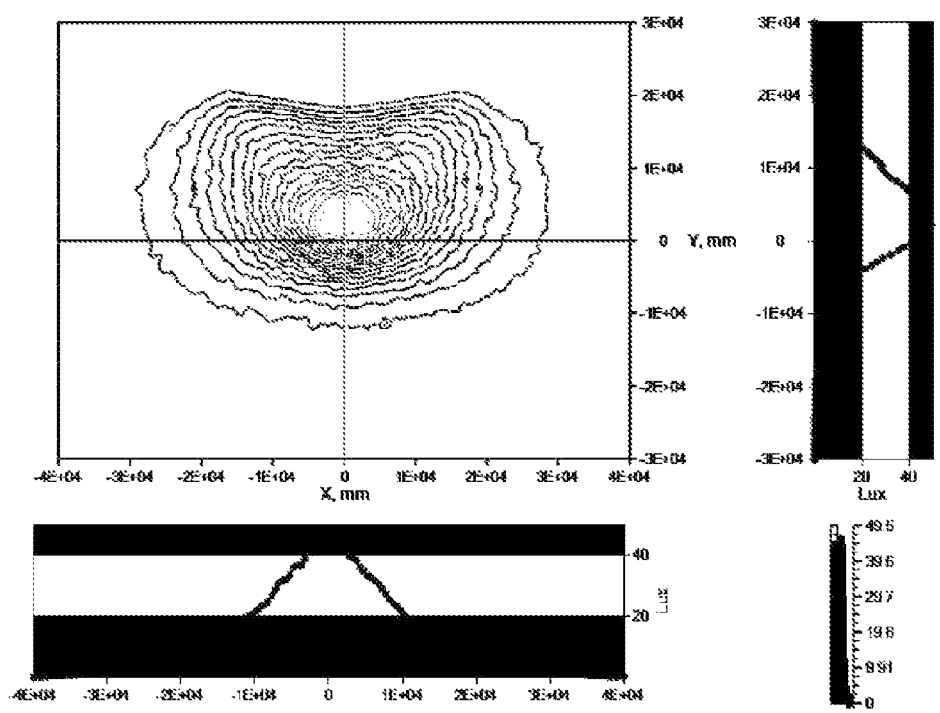
FIG. 10 is a schematic diagram of light spot shape and illumination distribution in 12 meters in embodiment 1 of the present invention.

FIG. 10 shows light spot shape and illumination distribution at 12 meters in the specific embodiment 1 of the secondary optical lens of the present invention. Light spots are distributed off the axis, and the centers of the light spots depart from the crossing point of horizontal and perpendicular spider lines and are distributed at the upper part.

Figure 11:
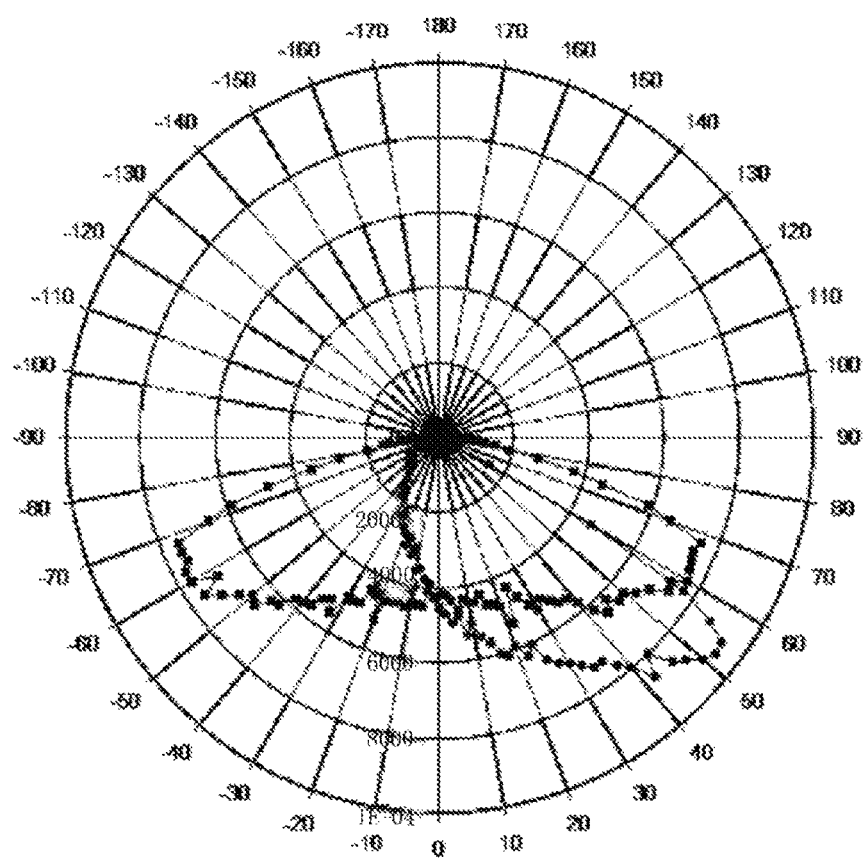
FIG. 11 is a schematic diagram of a light distribution curved surface in embodiment 1 of the present invention.

FIG. 11 shows a light distribution curved surface of the specific embodiment, including two curves, wherein one curve is distributed off the axis, the highest light intensity direction of the curve departs from the 0-degree azimuth below by about 58°, the other curve is distributed as symmetrical bat wings, and the full beam angles of the other curve are about 148° (namely, ±74°) and accord with the design objective.

Figure 12:
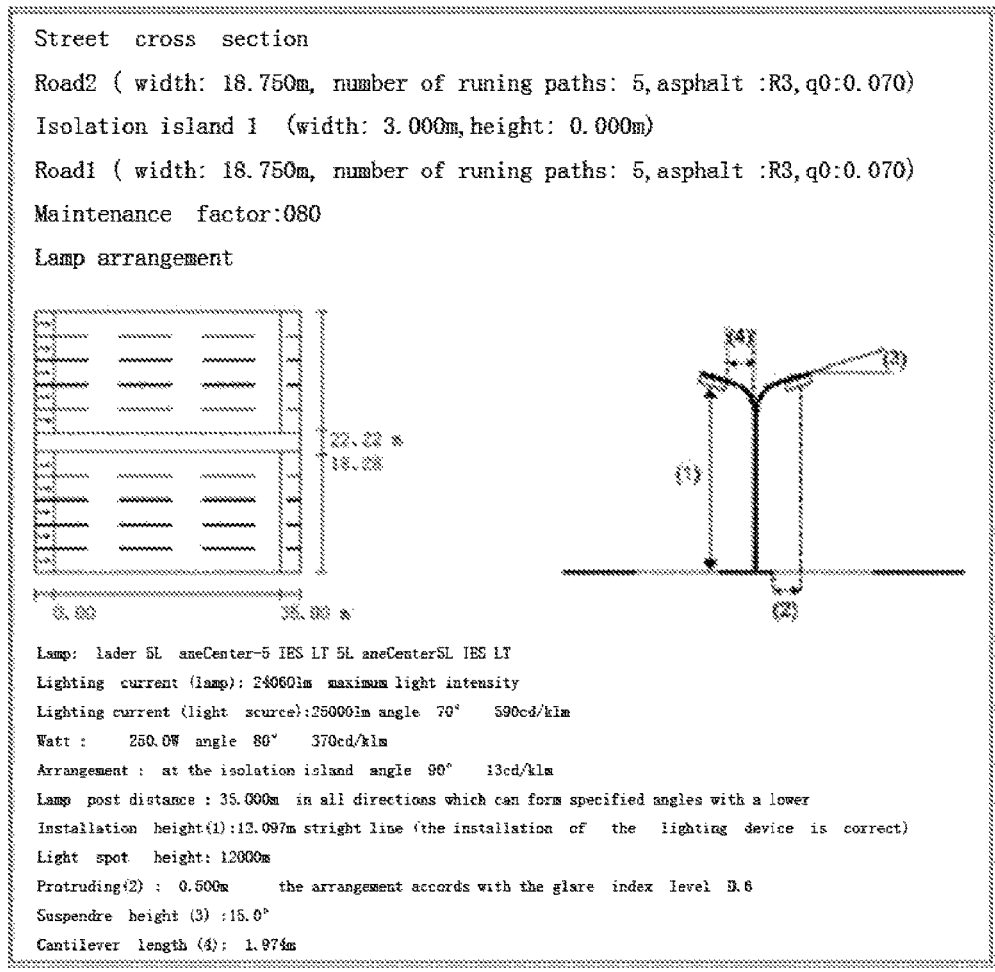
FIG. 12 is a schematic diagram of a simulation result of road lighting in embodiment 1 of the present invention.

FIG. 12 shows simulation of effect on road lighting of the specific embodiment 1 of the present invention. The road has 5 lanes on a single side (totally 10 lanes in two directions) and an isolation island with the width of 3 meters in the middle, the width of a single lane is 3.75 meters, and the total width of the 5 lanes is 18.75 meters. The light flux of the lamp is 24060 lumens, the distance between lamp posts is 35 meters, the height of the lamp post is 12 meters, the elevation angle of the lamp cap is 15 degrees, and the length of the cantilever is 2 meters. The lamp post is arranged on the isolation island in the middle of the road, and two lamp caps are respectively arranged on the left and right sides of each lamp post.

Figure 13:
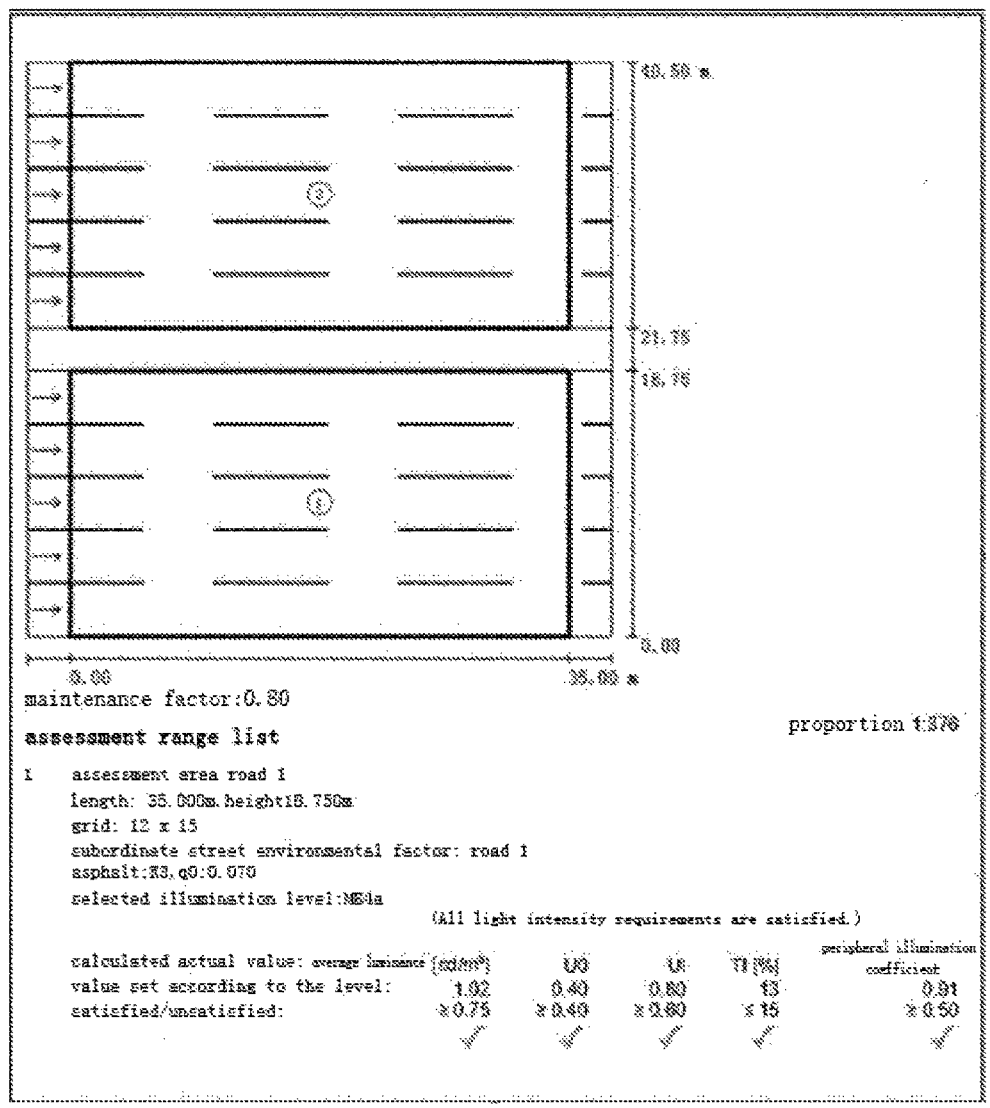
FIG. 13 is a schematic diagram of an analysis result of road lighting and road brightness distribution in embodiment 1 of the present invention.

FIG. 13 shows an analysis result of road lighting and road brightness in the specific embodiment 1 of the secondary optical lens of the present invention. It can be seen that all the indexes meet ME4a urban road lighting design standards, the brightness uniformity U0 of the overall road is 0.4, the longitudinal uniformity UL of the road is 0.8, and the glare index TI is less than 15.

Figure 14:
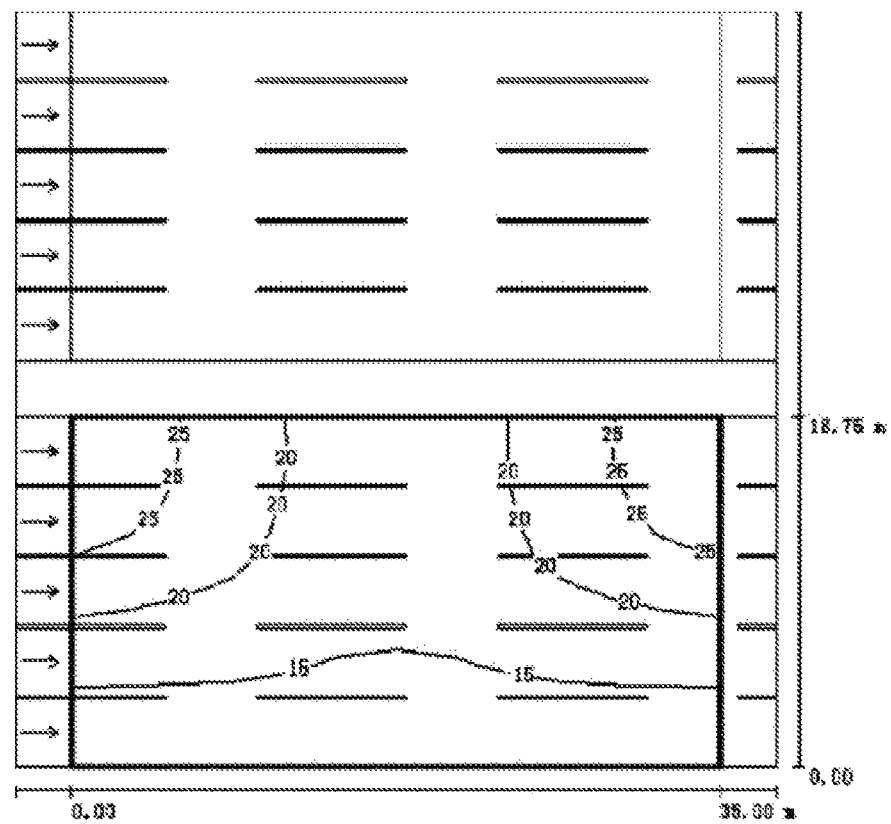
FIG. 14 is a schematic diagram of an analysis result of road lighting and road illumination distribution in embodiment 1 of the present invention.

FIG. 14 shows an analysis result of road lighting and road illumination in the specific embodiment 1 of the secondary optical lens of the present invention. It can be seen that the average illumination of the 5 lanes on the single side is 18 lux, the minimum illumination is 11 lux, the maximum illumination is 28 lux, the ratio of the minimum illumination to the average illumination is 0.617, and the ratio of the minimum illumination to the maximum illumination is 0.407. The road with 5 lanes can obtain a quite uniform lighting effect.

Embodiment 2 may be referred to FIGS. 15-18.

Figure 15:
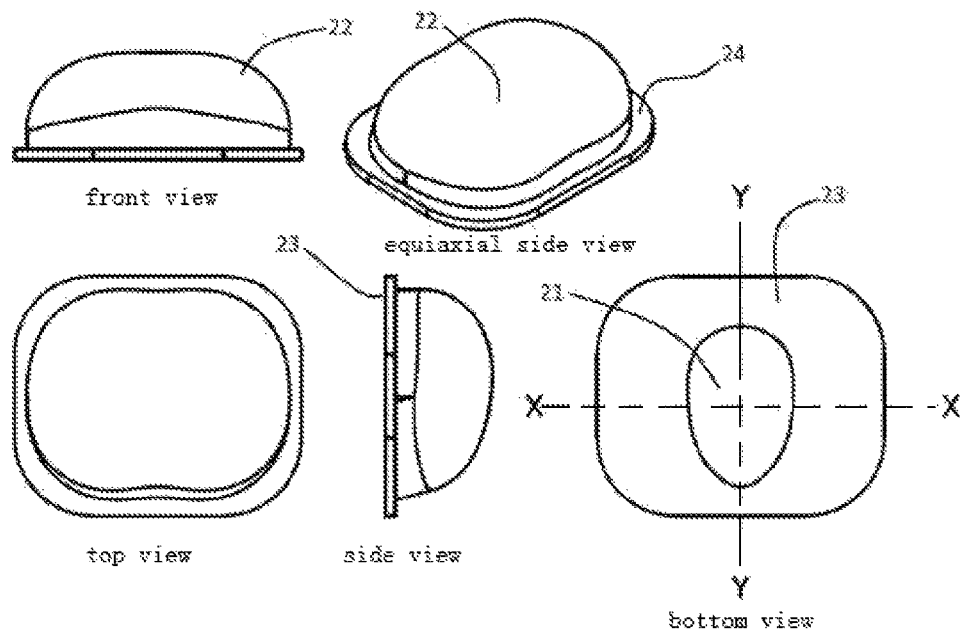
FIG. 15 is a three-dimensional view of a secondary optical lens in embodiment 2 of the present invention.
Figure 16:
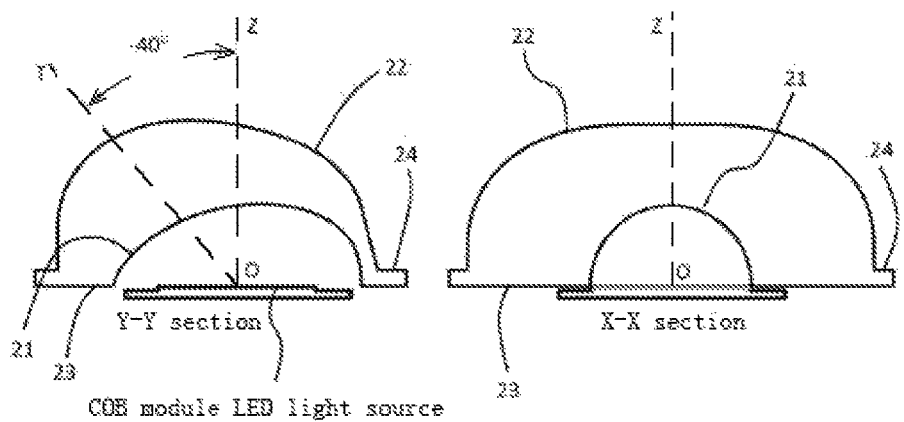
FIG. 16 shows sectional views of the secondary optical lens in embodiment 2 of the present invention in the Y-Y direction and the X-X direction.

The specific embodiment 2 of the secondary optical lens of the present invention relates to a light distribution method for a COB module LED street lamp lens for 3 lanes. The three-dimensional views of the lens of this embodiment are shown in FIG. 15, and the sectional views of the lens in the X-X direction (the road extending direction) and the Y-Y direction (the direction perpendicular to the road) are shown in FIG. 16.

According to the structure characteristic, the lens is composed of a drop-shaped incident concave surface 21 close to the light source below, a light distribution curved surface 22 above, a bottom plane 23 and a mounting platform 24. The section profile line of the drop-shaped incident concave surface 21 of the secondary optical lens in the Y-Y direction is also composed of an inclined long elliptic arc and a short arc, as shown by the left view in FIG. 16; and the section profile line of the drop-shaped incident concave surface 21 in the X-X direction is semicircular, as shown by the right view in FIG. 16.

The section profile line of the light distribution curved surface 22 of the secondary optical lens in the Y-Y direction and an optical axis OZ form a polarization angle, the polarization angle in this specific embodiment is different from that in the specific embodiment 1 and is preferably −40°, and the polarization angle is determined according to the road width of 3 lanes and the height of a lamp post.

Positive and negative angles are defined herein as that the light departing from the optical axis OZ and shot out towards the left is negative, while the light departing from the optical axis OZ and shot out towards the right is positive. OZ is an optical axis which passes through the center point O of the light emitting surface of the COB module LED light source and is perpendicular to the light emitting surface. The section profile line of the light distribution curved surface 22 of the secondary optical lens in the X-X direction is a symmetrical curve of which the middle is slightly sunken, as shown by the right view in FIG. 16.

Because the polarization angle of the section profile line of the light distribution curved surface 22 of the specific embodiment 2 in the Y-Y direction is smaller than that of the specific embodiment 1, the overall size of the corresponding lens is much smaller than that in the specific embodiment 1 under the same size of the COB module LED light source, namely, the incident concave surface 21 and the light distribution curved surface 22 are larger.

The light distribution principles of the light distribution curved surface 22 of the specific embodiment 2 of the secondary optical lens of the present invention in the Y-Y direction and the X-X direction are the same as those of the specific embodiment 1, and also satisfy the light distribution conditions of Formula (1) and Formula (2).

Figure 17:
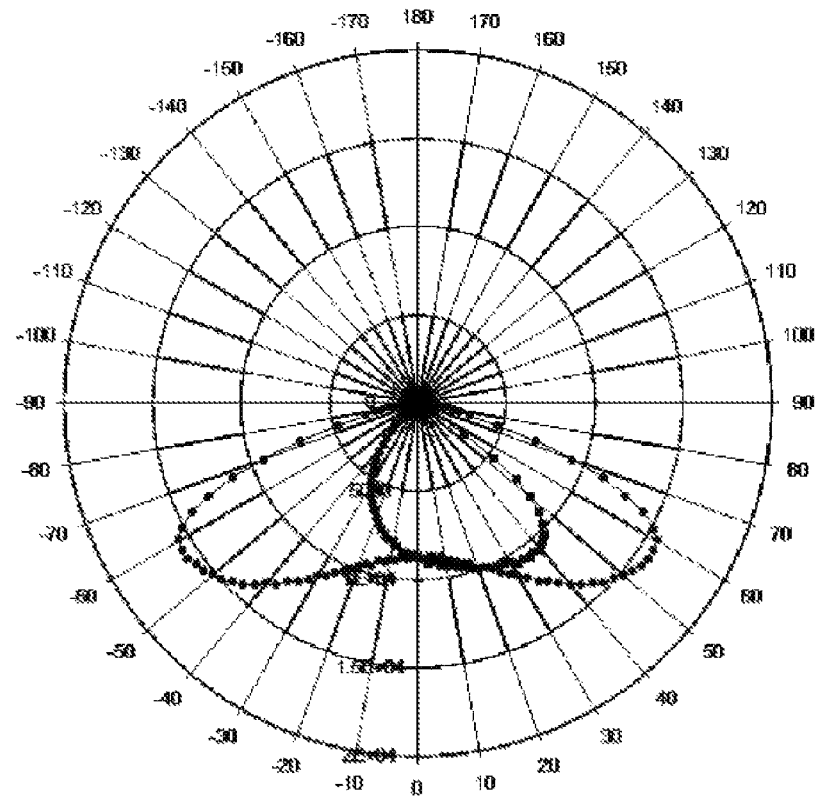
FIG. 17 is a schematic diagram of a light distribution curved surface in embodiment 2 of the present invention.

FIG. 17 shows a light distribution curved surface of the specific embodiment, totally including two curves, wherein one curve is distributed off the axis, the highest light intensity direction of the curve departs from the 0-degree azimuth below by about 40°, the other curve is distributed as symmetrical bat wings, and the full beam angles of the other curve are about 148° (namely, ±74°) and accord with the design objective.

Figure 18:
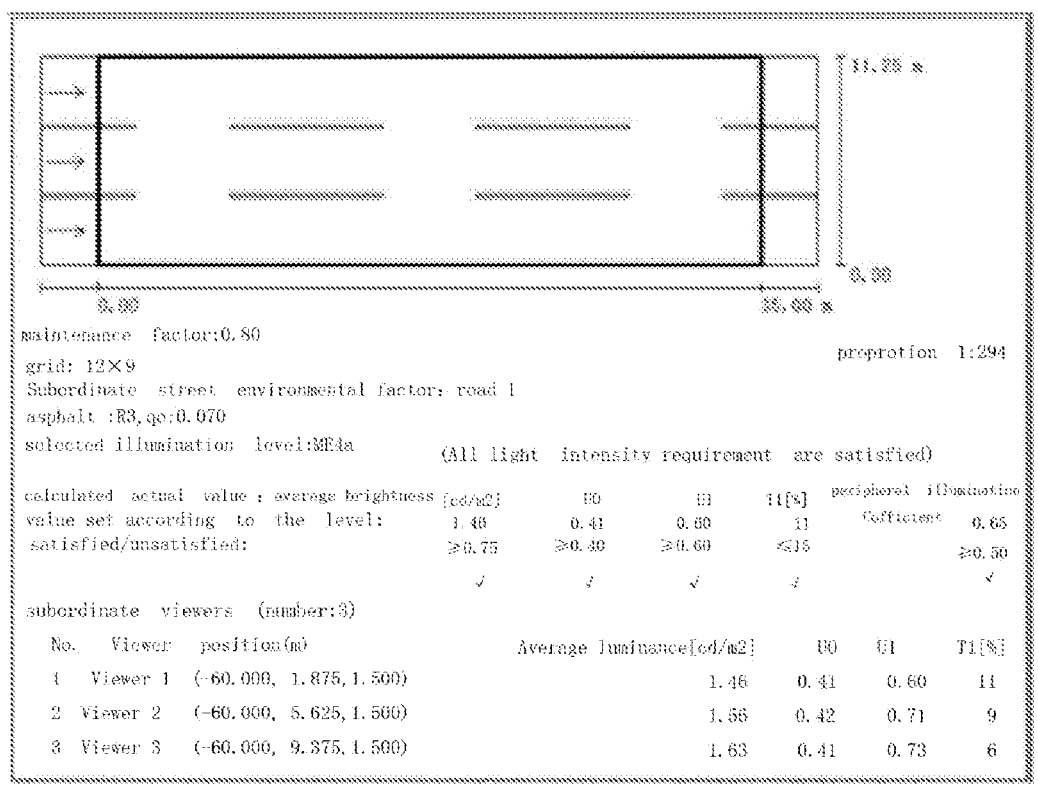
FIG. 18 shows an analysis result of road lighting and road brightness distribution in embodiment 2 of the present invention.

FIG. 18 shows an analysis result of road brightness (road lighting) in the specific embodiment 2 of the secondary optical lens of the present invention. It can be seen that all the indexes meet ME4a urban road lighting design standards, the brightness uniformity U0 of the overall road is 0.41, the longitudinal uniformity UL of the road is 0.6, and the glare index TI is 11.

The present invention has the following beneficial effects: the light distribution method provides a foundation for the use of a single COB module LED light source in an urban road, and is low in cost and high in efficiency.

The description of the disclosed embodiments is provided to illustrate the present invention to those skilled in the art. Various modifications to these embodiments will be readily apparent to those skilled in the art, and the generic principles defined herein may be applied to other embodiments without departing from the spirit or scope of the invention. Thus, the present invention is not intended to be limited to the embodiments shown herein but is to be accorded the widest scope consistent with the principles and novel features disclosed herein.

What is claimed is:

1. A light distribution method for a COB module LED street lamp lens capable of illuminating 3 or 5 lanes, wherein:
    light emitted by a COB module LED light source is firstly refracted by a drop-shaped refraction lens and then refracted secondarily by a light distribution curved surface lens to achieve an optimal irradiation effect;

a section profile line of the drop-shaped refraction lens in the direction perpendicular to the road, namely, the Y-Y direction, is composed of an inclined long elliptic arc and a short arc;

a section profile line of the drop-shaped refraction lens in the road extending direction, namely, the X-X direction, is semicircular, and a curved surface of the drop-shaped refraction lens is formed by sweeping the section profile line in the Y-Y direction along the section profile line in the X-X direction;

the light distribution curved surface lens has different angles of asymmetrical light distribution in the Y-Y direction and the X-X direction, a section profile line of the light distribution curved surface lens in the Y-Y direction and an optical axis OZ form a polarization angle, and light distribution to single light satisfies the following condition:

$$\theta 2 = \tan^{-2}\left[\frac{(\theta 1 - \Psi t)\tan\Phi r + (90° - \theta 1)\tan\Phi l}{90° - \Psi t}\right]$$

where θ2 is an included angle between emergent light and the optical axis, and the optical axis is a straight line which passes through the center point O of the COB module LED light source and is perpendicular to a bottom surface, θ1 is an included angle between incident light and the optical axis; Ψt is an included angle between an axis OT connecting a point farthest from a point O on the Y-Y section profile line of the light distribution curved surface lens with the point O and the optical axis OZ, Φl and Φr are respectively included angles between marginal emergent light on the left and the right of the light distribution curved surface lens and the optical axis OZ;

the section profile line in the X-X direction is a symmetrical saddle-shaped curve, and the light distribution of the light distribution curved surface to the single light satisfies the following condition:

$$\delta 2 = \tan^{-1}\left[\frac{\delta 1}{90°} \cdot \tan 74°\right]$$

where δ1 is an included angle between the incident light OU and the optical axis OZ, and δ2 is an included angle between the emergent light VW and the optical axis; and the light distribution curved surface lens is formed by sweeping the section profile line in the Y-Y direction along the section profile line in the X-X direction.

2. The method according to claim 1, wherein:
the polarization angle Ψt is ranged from −30° to −60°.

3. The method according to claim 1, wherein:
the section profile line of the drop-shaped refraction lens in the Y-Y direction is composed of an inclined long elliptic arc ABC and a short arc CD;
the short axis of the ellipse is OB, the long axis is OC, the ratio of the long axis to the short axis is 1.6;
the inclination angle τ between the short axis OB and the optical axis OZ is −19.3°;
the short axis is 10-20 mm so as to just cover a light source surface; and
the arc CD and the elliptic arc ABC share a circle center.

4. The method according to claim 1, wherein:
all the light emitted from the center point O of the light emitting surface of the COB module LED light source is refracted by the concave surface of the drop-shaped refraction lens and then distributed by the light distribution curved surface lens arranged above, and the highest light intensity direction of the emergent beams after the light distribution is shot out in the polarization axis OT direction of the lens.

5. The method according to claim 1, wherein:
all the light emitted from the center point O of the light emitting surface of the COB module LED light source is refracted by the concave surface of the drop-shaped refraction lens, the direction of the refracted light is kept unchanged, the light is not polarized and is directly distributed by the light distribution curved surface lens arranged above, and the emergent light after the light distribution is uniformly distributed within a range of ±74° with the optical axis OZ.

6. The method according to claim 3, wherein:
the short axis is 15 mm.

7. The method according to claim 1, wherein:
a middle position of the saddle-shaped curve is sunken for 0.30-0.36 mm relative to the highest position of two shoulders of the saddle-shaped curve.

* * * * *